(12) United States Patent
Mattsson (10) Patent No.: US 8,059,333 B2
(45) Date of Patent: Nov. 15, 2011

(54) BLUE EXTENDED SUPER CONTINUUM LIGHT SOURCE

(75) Inventor: Kent Mattsson, Virum (DK)

(73) Assignee: NKT Photonics A/S, Birkerod (DK)

( * ) Notice: Subject to any disclaimer, the term of this patent is extended or adjusted under 35 U.S.C. 154(b) by 0 days.

(21) Appl. No.: 12/847,064

(22) Filed: Jul. 30, 2010

(65) Prior Publication Data

US 2011/0102882 A1 May 5, 2011

Related U.S. Application Data

(63) Continuation of application No. 11/988,375, filed as application No. PCT/DK2006/050027 on Jun. 28, 2006, now Pat. No. 7,800,818.

(60) Provisional application No. 60/697,389, filed on Jul. 8, 2005.

(30) Foreign Application Priority Data

Jul. 8, 2005 (DK) ................. 2005 01010

(51) Int. Cl.
*G02F 2/02* (2006.01)
*H01S 3/10* (2006.01)

(52) U.S. Cl. ............... 359/326; 385/122; 372/6; 372/23

(58) Field of Classification Search .................. 359/326; 385/122; 372/6, 23

See application file for complete search history.

(56) References Cited

U.S. PATENT DOCUMENTS

| 2005/0117841 A1 | 6/2005 | Braun et al. |
| 2007/0216989 A1 | 9/2007 | Nerin et al. |
| 2008/0226242 A1 | 9/2008 | Buchter et al. |

FOREIGN PATENT DOCUMENTS

| WO | WO 00/49436 | 8/2000 |
| WO | WO 02/12931 | 2/2002 |
| WO | WO 02/39159 | 5/2002 |
| WO | WO 02/084350 | 10/2002 |
| WO | WO 02/088801 | 11/2002 |
| WO | WO 03/079074 | 9/2003 |
| WO | WO 03/096490 | 11/2003 |
| WO | WO 2005/059612 | 6/2005 |

(Continued)

OTHER PUBLICATIONS

Bjarklev et al., "Photonic Crystal Fibers" Kluwer Academic Press, 2003, pp. 116-130.

(Continued)

*Primary Examiner* — Hemang Sanghavi
(74) *Attorney, Agent, or Firm* — Buchanan Ingersoll & Rooney, P.C.

(57) ABSTRACT

In a blue extended super continuum light source, when pulses of partly coherent monochromatic "pump" radiation of essentially constant amplitude are propagating through a microstructure fiber medium within a region of anomalous dispersion of the medium, then, provided the medium has a finite nonlinear coefficient of the index of refraction, the pump pulse is subject to a modulation instability. This results in formation of a train of narrow pulses with Tera Hertz repetition rate. Phase match between red shifted Raman solitons generated by the pump pulse and energy shed by the pump pulse at all frequencies with a group velocity below the pump pulse group velocity may lead to the formation of Cherenkov radiation. The solitons may seed Cherenkov radiation at different wavelengths depending on the actual fiber parameters. This allows extension of generated super continuum light beyond the four wave mixing limit when applying picosecond or nanosecond pump pulses.

29 Claims, 5 Drawing Sheets

FOREIGN PATENT DOCUMENTS

WO    WO 2005/062113    7/2005

OTHER PUBLICATIONS

D. V. Skryabin et al., "Soliton Self-Frequency Shift Cancellation in Photonic Crystal Fibers" Science American Assoc., 2003, vol. 301, No. 5604, pp. 1705 and 1708, XP-002419379.

G. E. Town et al., "Optical Supercontinuum Generation from Nanosecond Pump Pulses in an Irregularly Microstructured Air-Silica Optical Fiber" Applied Physics B (Lasers and Optics), 2003, vol. B77, No. 2-3, pp. 235-238.

Genty Goery et al., "Route to Supercontinuum in Photonic Crystal Fibers" Pacific Rim Conference on Lasers.., Cleo—Technical Digest, 2002, pp. 282-283, XP009061447.

H. Ludvigsen, "Novel Supercontinuum Sources" 2005, pp. 13-15, XP-010834255.

Ilaria Cristiani et al., "Dispersive Wave Generation by Solitons in Microstructured Optical Fibers" Optics Express, 2004, vol. 12, No. 1, pp. 124-135, XP-002366847.

J. Herrmann et al., "Experimental Evidence for Supercontinuum Generation by Fission of Higher-Order Solitons in Photonic Fibers" Physical Review Letters, 2002, vol. 88, No. 17, pp. 173901-1-173901-4.

J. H. V. Price et al., "Soliton Transmission and Supercontiriuum Generation in Holey Fiber, Using a Diode Pumped Ytterbium Fiber Source" Optics Express, 2002, vol. 10, No. 8, pp. 382-387, XP-002366843.

J. H. V. Price et al., "UV Generation in a Pure-Silica Holey Fiber" Applied Physics B, 2003, vol. B 77, No. 2-3, pp. 291-298, XP-002366844.

Jinendra K. Ranka et al., "Visible Continuum Generation in Air-Silica Microstructure Optical Fibers with Anomalous Dispersion at 800 nm" Optics Letters, 2000, vol. 25, No. 1, pp. 25-27.

L. Tartara et al., "Blue Light and Infrared Continuum Generation by Soliton Fission in a Microstructured Fiber" Applied Physics B, 2003, vol. B77, No. 2-3, pp. 307-311, XP-002366846.

Stephane Coen et al., "White-Light Supercontinuum Generation with 60-ps Pump Pulses in a Photonic Crystal Fiber" Optics Letters, 2001, vol. 26, No. 17, pp. 1356-1358.

T. A. Birks et al., "Supercontinuum Generation in Tapered Fibers" Optics Letters, 2000, vol. 25, No. 19, pp. 1415-1417, XP-000981159.

T. A. Birks et al., "Endlessly Single-Mode Photonic Crystal Fiber" Optics Letters, 1997, vol. 22, No. 13, pp. 961-963.

Xun Gu, "Measuring Ultracomplex Supercontinuum Pulses and Spatio-Temporal Distortions" 2004, pp. 1-13 and 90-99, XP-002369463.

T. Schreiber et al., "High Average Power Supercontinuum Generation in Photonic Crystal Fibers", Optics Communications 228, 2003, pp. 71-78, Elsevier B.V.

BLUE EXTENDED SUPER CONTINUUM LIGHT SOURCE

TECHNICAL FIELD OF THE INVENTION

The invention relates to the field of super continuum light generation in microstructure fibres. In particular, this invention relates to a super continuum source configured to produce light within a selectable bandwidth blue shifted relative to the pump wavelength in microstructure fibres by trains of Tera Hertz repetition rate pulses.

BACKGROUND OF THE INVENTION

Super continuum (SC) generation is a nonlinear phenomenon characterised by dramatic spectral broadening of intense light pulses passing through a nonlinear material. SC generation occurs in various media and finds use in numerous applications ranging from spectroscopy to ultra-short-pulse generation. Inter alea, optical radar and ranging (LIDAR), spectroscopy, optical computing, and reaction rate studies. Spectral slicing of the generated SC is the main mean to design such multi wavelength optical sources. The presently available SC sources hold a spectral density below 0.1 mW/nm (−10 dBm/nm).

The newly developed micro structured fibres (MF) possess unique optical properties which allow generating SC with a broader bandwidth than what is possible in bulk silica or in standard optical fibres. Since the first report on SC generation in a MF in 1999 by Ranka et al. (Optics Letters, Vol. 25, no. 1, (2000), pp. 25-27) comprehensive efforts have been made to understand the physical mechanisms leading to the generation of light with a broad spectrum in this type of fibres, and an extensive literature has been published on the subject. The bulk part of these studies utilises femto-second pulses ($10^{-15}$ s) to generate the SC. The physical mechanism responsible for the SC generation is believed to be the creation and fission of higher order solitons according to J. Herrmann et al., Phys. Rev. Letters, Vol. 88, No 17, 2002. It has also been shown that it is possible to create SC by use of pico- and nanosecond pulses, and the mechanism responsible for these SCs are believed to be a combination of four wave mixing and stimulated Raman scattering (Coen et al., Optics Letters, Vol. 26, (2001), pp. 1356-1358, and Town et al. Applied Physics B (Lasers and Optics), vol. B77, no. 2-3, September 2003, pp. 235-238). The possibility of tailoring the properties of MFs for improving the efficiency of SC light generation using pico- or nanosecond pulses has, however, been little explored. The use of longer pulses is, however, attractive as it does not require a complex and expensive femto second laser. This has so far been the main obstacle to the creation of commercially viable SC light sources.

The spectral slicing of a SC only utilizes a small part of the launched energy. This energy is symmetrically distributed around the pump and primarily generated through a four wave mixing process or alternatively red shifted relative to the pump when stimulated Raman scattering dominates the generation process in the case of inefficient phase matching of the four wave mixing process. The hereby generated blue light will be limited to the half pump wavelength due to energy conservation of the four wave mixing process. Here the blue shifted light (idler) is generated through the action of two pump photons and a red shifted (signal) photon. The idler light wavelength generated through the four wave mixing process is determined through the conservation of energy equation: $h \nu_{idler} = 2 h \nu_{pump} - h \nu_{signal} <=> 1/\lambda_{idler} = 2/\lambda_{pump} - 1/\lambda_{signal}$, where $\nu$ and $\lambda$ denote frequency and wavelength, respectively, and h is Planck's constant. For the hypothetic situation of the infrared part of the SC extending to infinity the idler wavelength minimum is to be found at the half pump wavelength.

Figure 1:
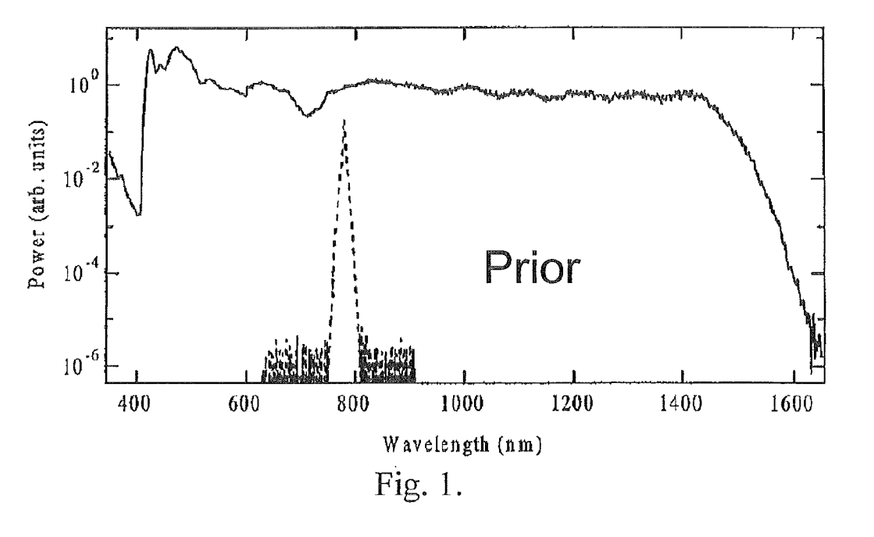
Figure 4:
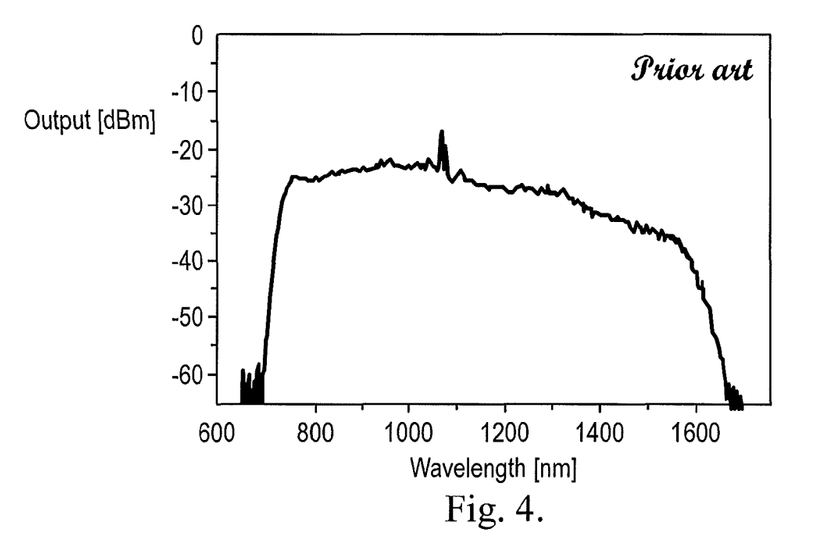
FIG. 4 shows a prior art optical spectrum of a SC generated in a 5 m section of microstructure fibre. The launched pulse duration is 8.5 ps with input peak powers of P=5.8 kW. Prior art by Braun and Bertram European patent EP 1 502 332.

The four wave mixing or Stimulated Raman Scattering will hereby either require considerable pump energy or unattractive short pump wavelength when generating light in the near infrared (760-1300 nm), visible (400 nm-760 nm) and/or at UV wavelengths (<400 nm) and cannot generate light below a wavelength of $\lambda_{pump}/2$. In prior art SCs shown in FIG. 1 for a 100 femto second pulse generated spectrum and in FIG. 2 for a 60 ps pulse generated spectrum there is no significant light generated below the half pump wavelength. In prior art SC from European patent application EP 1502332 by Braun and Bertram shown in FIG. 4 for a 8.5 ps 5.8 kW pulse generated spectrum there neither is light generated below the half pump wavelength. This spectrum shows power intensity of the red shifted part that is equal to or smaller than the power intensity of the blue shifted part in contrary to the SCs of FIG. 1 and FIG. 2. This indicates that the light is generated through another process than four wave mixing. The generated spectrum shows in the blue part a spectral density of −25 dBm/nm.

Figure 5:
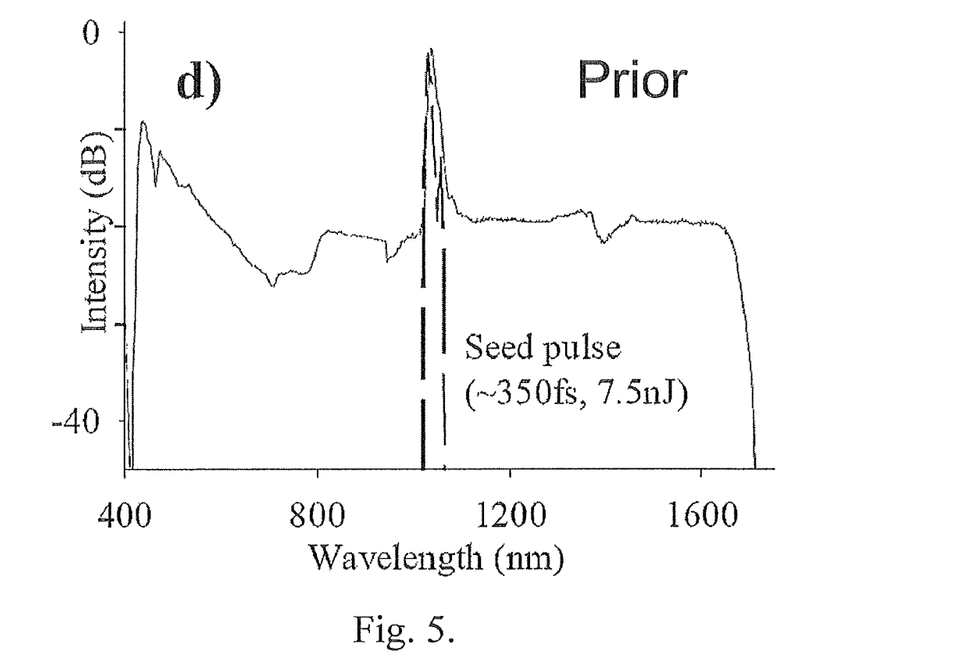
FIG. 5 shows a prior art optical spectrum of a SC generated in a 7 m section of non periodic microstructure fibre. The launched pulse duration is 350 fs with input peak power of P=21 kW. Prior art by Price et al. (Optics Express Vol. 10, No. 8, Mar. 20 (2002))

In prior art SC from Price et al. (Optics Express Vol. 10, No. 8, Mar. 20 (2002)) shown in FIG. 5 a blue extended spectrum with −10 dBm/nm output power in the blue part of the spectrum for a single pulse 21 kW peak power 350 fs excitation pulse launched into a microstructure fibre with a core diameter 1.6 μm is shown. Thus, there is a need for a light source providing a spectrum extending below $\lambda_{pump}/2$ with a spectral density exceeding −10 dBm/nm.

Figure 2:
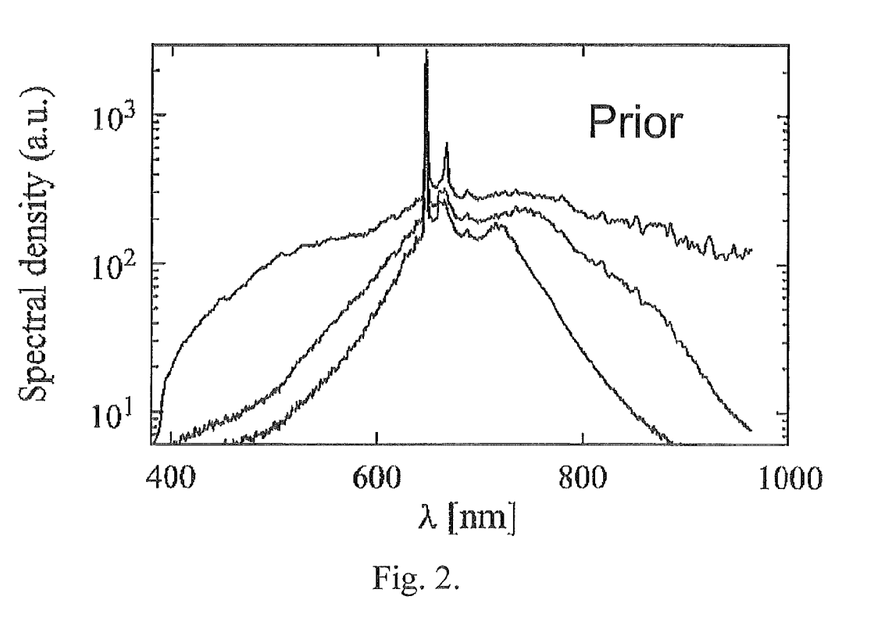
FIG. 2 shows a prior art optical spectrum of a SC generated in a 10 m section of microstructure fibre. The launched pulse duration is 60 ps with input peak powers of (from bottom to top) P=120 W, P=225 W, and P=675 W. Prior art by Coen et al. (Optics Letters, Vol. 26, no. 17, September (2001), pp. 1356-1358)
Figure 3:
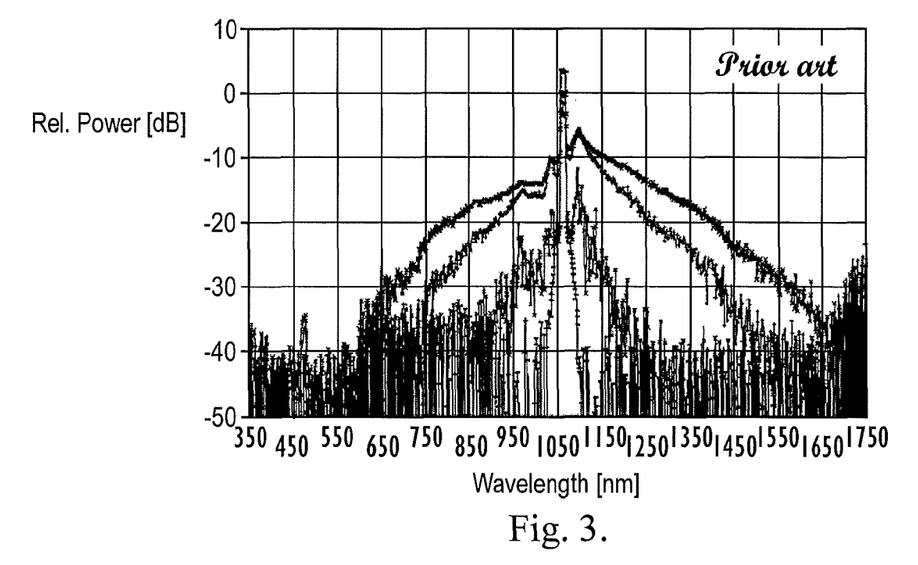
FIG. 3 shows a prior art optical spectrum of a SC generated in a 2 m section of microstructure fibre. The launched pulse duration is 42 ns with input peak powers of (from bottom to top) P=1 kW, P=3.5 kW, P=5.5 kW and P=10 kW. Prior art by Town et al. Applied physics B (Lasers and Optics), vol. B77, no. 2-3, September 2003, pp. 235-238.

In prior art SC generated by ps or ns pulses the power intensity of the red shifted part measured in mW/nm is equal to or larger than the intensity of the blue shifted part. Examples of such generated spectra are shown in FIG. 2 and FIG. 3. Thus there is a need for a light source with an improved power intensity of the blue shifted light relative $\lambda_{pump}$ compared to the red shifted light relative to $\lambda_{pump}$ with a spectral density exceeding −10 dBm/nm.

SUMMARY OF THE INVENTION

In the following a new method for generating light is presented. This method can advantageously be applied to yield a new SC source that can be managed to have a substantial part of its output in the UV, visible or near infrared when a pump wavelength in the wavelength range of for example 900-1100 nm is used.

The invention teaches that a pulsed pump source with substantially constant pulse peak amplitude propagating through a dispersive medium, will undergo amplitude modulation, with the modulation depth growing exponentially with time, provided that the pump wavelength lies in a region of anomalous dispersion of the transmission medium. This amplitude modulation means that part of the energy in the pump has been shifted into sidebands. The generated sidebands are the result of modulation instability gain that exists near the pump frequency.

Upon launch of a high peak power pulse into a fibre the Kerr effect will contract the pulse which in the frequency domain corresponds to broadening of the spectrum. Once the spectrum is broad enough to cover the maximum modulation instability gain this takes over and breaks the pulse into a pulse train of short pulses of Tera hertz repetition rate ($10^{12}$ Hz). A positively chirped pulse will hereby help the contraction to meet the maximum gain at the earliest possible point and hereby initiate the modulation instability gain takeover at the earliest possible point.

The modulation instability gain takes over the process and sidebands are generated at the angular frequencies $\Omega_{max}$ determined by equation 1:

$$\Omega_{Max} = \pm \sqrt{\frac{2\gamma\, P_{Peak}}{|\beta_2|}} \quad (1)$$

where $\gamma$, $P_{peak}$ and $\beta_2$ are explained below. The generated sidebands will, if the pump power is sufficiently strong, generate their own sidebands through a modulation instability gain given that the sidebands are generated at a frequency with anomalous dispersion. The repetition rate of the generated pulse train is determined by $\Omega_{max}/2\pi$.

Now, having generated a train of short pulses the formation of solitons through the interplay between self phase modulation (SPM, the Kerr effect) and anomalous dispersion of the fibre can take place. I.e. the dispersion length of the fibre $L_D = T_0^2/\beta_2$ has become of comparable size to the nonlinear length $L_{NL} = 1/(\gamma P_{Peak})$ of the fibre due to the formation of the train of short pulses. The self phase modulation generates a frequency chirp such that the leading edge of the soliton is red-shifted while its tailing edge is blue shifted from the central frequency. The anomalous dispersion contracts the pulse as the pulse is positively chirped by the SPM. These two effects will for certain pulse durations and peak power levels balance each other out and a soliton is created. The soliton order number N is determined by equation 2:

$$N = \sqrt{\frac{L_D}{L_{NL}}} = \sqrt{\frac{P_{Peak}\,\gamma\, T_0^2}{\beta_2}} \quad (2)$$

Here $P_{Peak}$ is the launched peak power, $T_0$ is the soliton duration (which is equal to $T_{FWHM}/1.763$, where $T_{FWHM}$ is the Full Width Half Maximum duration for a Gaussian pulse), and the second order dispersion parameter $\beta_2 = -\lambda^2/(2\pi c)\, D$, where $D = d/d\lambda(1/v_g)$ is the group velocity dispersion and $v_g$ is the group velocity, and c is the speed of light in vacuum, and $\gamma$ is the nonlinear parameter given by equation 3:

$$\gamma = \frac{2\pi\, n_2}{\lambda\, A_{eff}} \quad (3)$$

Here $n_2$ is the nonlinear refractive index of the fibre material and $A_{eff}$ is the effective mode area of the fibre.

Now, if the modulation instability gain of the pump or one of the generated sidebands of the pump holds an overlap with a zero dispersion point, soliton formation will primarily take place in the vicinity of the zero dispersion point of the fibre due to the very low threshold for soliton formation. The fundamental soliton (N=1) can be created with very low peak power as the second order dispersion parameter is zero at the dispersion zero point. Here the higher order terms of the dispersion will take over the process and determine the threshold for soliton formation ($\beta_2(\omega) = \beta_2(\omega_0) + (1/3)\beta_3(\omega_0)(\omega-\omega_0) + (1/12)\beta_4(\omega_0)(\omega-\omega_0)^2$. Solitons will also form from the sidebands (the maximum gain) or directly under the pump pulse (at the pump wavelength)—however, the generation process is less efficient as the creation power is considerable higher as compared with the zero dispersion point. Despite this fact it is the solitons created at the pump pulse wavelength that will dominate the SC generation process.

The light generation by solitons can be understood through the following teaching. The launched quasi-CW pump pulse can be regarded as a light particle ("light bullet") travelling through the glass fibre with a given speed (group velocity). If the quasi_CW pump pulse group velocity exceeds the linear phase velocity of a given wavelength, a dispersive wave can be created. Explained in another way the electrons in the glass are displaced and polarized by the passing quasi-CW pulse photons. Some of these glass molecule electrons are excited to states above their ground state (by multiple photon excitation). Photons are re-emitted as the electrons in the glass restore to equilibrium during and after the quasi-CW pulse has passed. Under normal circumstances the re-emitted photons destructively interfere with each other and no radiation is detected.

The modulation instability gain has however transformed part of the energy in the quasi-CW pulse into a Tera hertz pulse train of solitons. As these solitons gain energy they contract in time and start to impose Raman amplification to themselves which leads to red shifting of the soliton central wavelength.

Where the red shifted soliton phase match with the randomly generated energy of the quasi-CW pulse energy it will be re-emitted in the blue part of the spectrum. This takes place where the quasi-CW pulse travels faster than the re-emitted photons, the re-emitted photons constructively interfere and intensify the radiation given that the soliton pulse and the re-emitted photons match in phase. The result is genuine Cherenkov radiation and the emitted light does not have to belong to the soliton spectrum as the soliton only seeds the re-emission process rather than to take part of it directly with its energy.

The light bullets will generate Cherenkov radiation if phase match between a dissipative mode in the UV or blue part of the spectrum exists for the given microstructure fibre medium. This phase match $\Delta\kappa$ is determined by equation 4:

$$\Delta\kappa = \beta(\omega_d) - (\beta(\omega_{bullet}) + \gamma P_0) \quad (4)$$

Where $\beta(\omega_d)$ and $\beta(\omega_{bullet})$ are the phase of the dissipative wave and the soliton with the peak power $P_0$, respectively, and $\gamma$ is the nonlinear parameter defined in equation (3).

The intensity of the generated Cherenkov radiation will be determined by the soliton self frequency shift of the light bullet. If the soliton self frequency shift of the light bullet is small, the central wavelength of the light bullet will remain for a longer period near the zero dispersion point and the generated Cherenkov radiation will increase in intensity as a function of propagation distance. The Cherenkov radiation is fed with energy from the soliton which again is fed with energy by the pump through the modulation instability gain. If the self frequency shift is large for the generated light bullet no significant level of Cherenkov radiation will be generated. The latter situation is what can be observed in prior art experiments with pico- or nanosecond pulse generation of SCs as a weak pilot beam blue shifted to the generated SC. No attention has, however, been paid to this pilot beam in the pico- or nanosecond pulse generation. In the Price et al. (Optics Express Vol. 10, No. 8, Mar. 20 (2002)) the blue extended spectrum is obtained as a result of such a phase match but no explanation was given for the observed spectrum and no route is given to describe how a higher spectral density is to be obtained.

The soliton self frequency shift $\Omega(z)$ at a distance z is given for the fundamental soliton by equation 5:

$$\Omega(z) = -\frac{T_R}{2}\frac{\beta_2}{T_0^4}z \quad (5)$$

Here $T_R$ is the Raman parameter—with a relaxation time in the 2-4 fs range.

Particularly intense radiation can be achieved in situations where the soliton central frequency is stabilized by the action of a negative dispersion slope as known from Skryabin et al. (Science Vol. 30, pp 1705-1708, 19 Sep. 2003). Here intense radiation with wavelength in the vicinity of the stabilized solitons near the second (red shifted) zero dispersion wavelength is expected.

In the present invention it is, however, not energy from the soliton that leads to generation of the blue part of the spectrum but merely the small perturbation of the electrons in the material caused by the soliton that seeds a phase match for energy exchange between the quasi-CW pulse and the Cherenkov radiation. It is observed that solitons stabilize at the negative dispersion slope from the infrared absorption edge, for a silica material this is observed at a wavelength near 2220 nm (4500 cm$^{-1}$), here termed the 'infra red absorption band edge stabilization point'. As long as the stabilized soliton holds an overlap with the quasi-CW pump pulse exchange of energy takes place.

An objective of the invention is to provide a scheme for extending the spectrum beyond (i.e. below) the half pump wavelength border ($\lambda_{pump}/2$) normally defined by the four wave mixing process. It will hereby simultaneously be possible to use a pump wavelength in the 900 nm-1100 nm range and generate light at UV or visible wavelengths with spectral density above −10 dBm/nm (>0.1 mW/nm).

Another objective of the present invention is to provide a light source with an increased power intensity of the blue shifted light relative to the pump wavelength compared with the red shifted light relative to the pump wavelength with spectral density above −10 dBm/nm (>0.1 mW/nm).

DISCLOSURE OF INVENTION

The present invention relates to a blue extended super continuum light source comprising: a pump laser which operates at a wavelength $\lambda_{pump}$ and produces pulses of a duration longer than 0.2 picoseconds with a repetition rate higher than 1 kHz, and a micro structured optical transmission medium adapted to transmit radiation at $\lambda_{pump}$, the medium having at least one wavelength region of anomalous dispersion, and the pump wavelength $\lambda_{pump}$ is chosen to lie within the region of anomalous dispersion of the transmission medium thereby breaking said pump pulses into trains of Tera Hertz repetition rate pulses. Hereby efficient generation of radiation is achieved such that the power in the blue shifted part of the spectrum is larger than the power in the red shifted part of the spectrum, both relative to the pump wavelength:

$$\int_{\lambda_{pump}-\lambda_1}^{\lambda_{pump}-\lambda_2} I(\lambda)d\lambda \geq M \int_{\lambda_{pump}+\lambda_2}^{\lambda_{pump}+\lambda_1} I(\lambda)d\lambda$$

where the multiplication factor $M \geq 1$, and $\lambda_{pump}-\lambda_1$ defines the low wavelength border of the generated light as: $I(\lambda_{pump}-\lambda_1)/I(\lambda_{pump}+\lambda_1) \leq 0.01$, and $\lambda_{pump}-\lambda_2$ defines the high wavelength border of the generated light, where $0 < \lambda_2 < \lambda_1 < \lambda_{pump}$, wherein a low wavelength border $\lambda_{pump}-\lambda_1$ of the generated blue shifted light is below the half pump wavelength, such that $2(\lambda_{pump}-\lambda_1) < \lambda_{pump} <=> \lambda_{pump} < 2\lambda_1$ and the intensity of at least part of the generated radiation $I(\lambda) > -25$ dBm/nm, where $\lambda_1 < \lambda < \lambda_2$.

It has surprisingly turned out that spectra generated with very different excitation conditions holds similar spectral distribution of the energy while holding the peak power of the pump pulses constant.

In an aspect of the invention, a blue extended super continuum light source is provided, the light source comprising:
a) a pump laser which operates at a wavelength $\lambda_{pump}$ and produces pump pulses of a duration longer than 0.2 picoseconds with a repetition rate higher than 1 kHz, and a peak power $P_{Peak}$, and
b) the blue part of the generated spectrum substantially extends from a low wavelength border $\lambda_{pump}-\lambda_1$ to a high wavelength border $\lambda_{pump}-\lambda_2$, and
c) a micro structured optical fibre adapted to transmit radiation at $\lambda_{pump}$, the fibre having at least one wavelength region of anomalous dispersion and a second order dispersion parameter $\beta_2(\lambda)$, and a non-linear parameter $\gamma$, so that a phase match between said low wavelength border and the infra red absorption band edge stabilization point is provided at said peak power, and the high wavelength border is chosen so that the group velocity at said high wavelength border is smaller than or equal to the group velocity at said pump wavelength, and
d) the pump wavelength $\lambda_{pump}$ is chosen to lie within the region of anomalous dispersion of the fibre, and said peak power, said second order dispersion parameter $\beta_2$, and said non-linear parameter $\gamma$ are chosen such that a part of each of said pump pulses breaks into trains of Tera Hertz repetition rate pulses, and
e) where—while keeping said peak power constant at the chosen level—said duration and said repetition rate of said pump pulses are arranged to provide that the intensity of at least part of the generated radiation $I(\lambda) > -10$ dBm/nm where $\lambda 1 < \lambda < \lambda 2$.

Figure 9A:
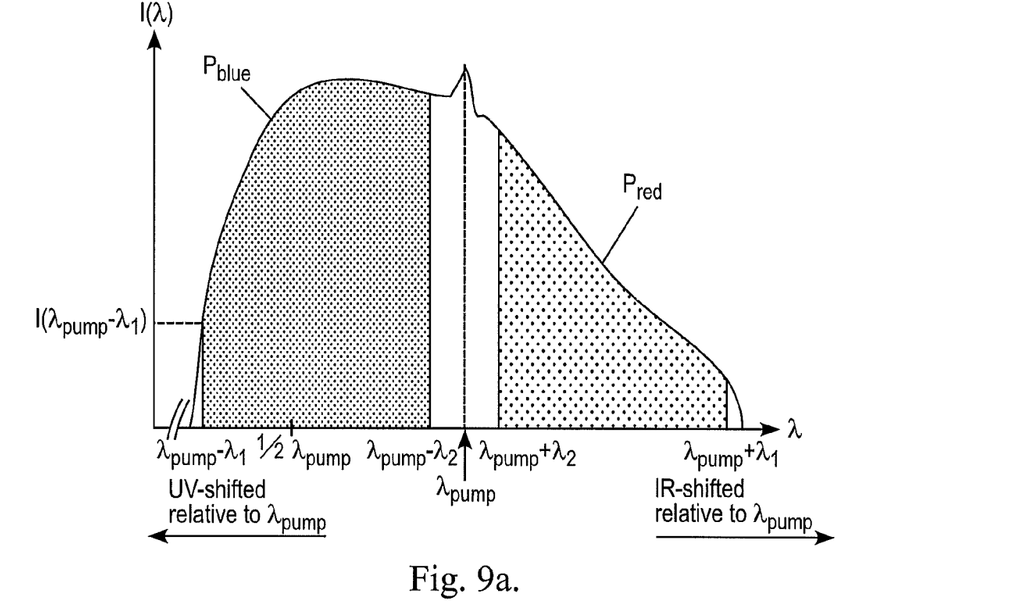
Figure 9B:
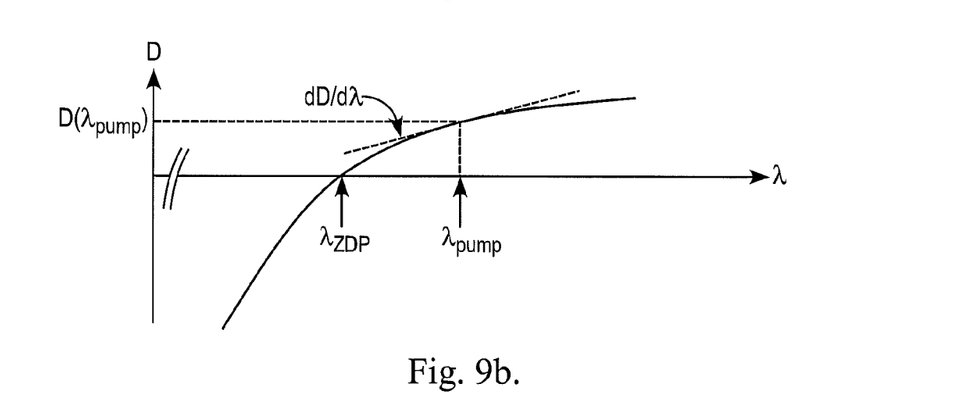
Figure 9C:
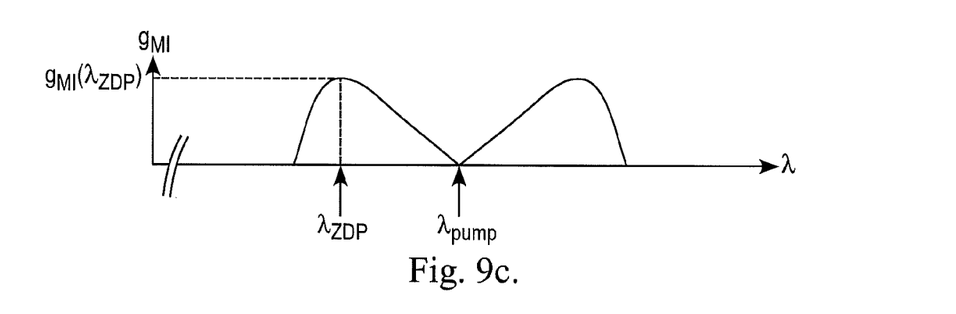

Some of the characteristics of a super continuum spectrum $I(\lambda)$ according to the invention (including the above mentioned wavelengths $\lambda_1$, $\lambda_2$ and $\lambda_{pump}$) are schematically indicated in FIG. 9, where $P_{blue}$ and $P_{red}$ indicate the 'blue shifted part' and the 'red shifted part' of the spectrum, respectively (the above relation thus being expressed as $P_{blue} \geq M \cdot P_{red}$). The scale of the $I(\lambda)$-axis can be logarithmic (e.g. in units of dBm/nm) and the scale of the $\lambda$-axis linear (e.g. correspondingly in units of nm). An exemplary schematic dispersion curve $D(\lambda)$ is shown in FIG. 7b indicating an anomalous dispersion around the pump wavelength $\lambda_{pump}$ ($D(\lambda_{pump}) > 0$, e.g. +8 ps/nm/km). An exemplary schematic modulation instability gain curve $g_{MI}(\lambda)$ for a specific peak power $P_{Peak}$ is shown in FIG. 9c.

An advantage of the present invention is the possibility to use longer pump pulses, which is attractive as it does not require a complex and expensive femto second laser.

This has so far been the main obstacle to the creation of commercially viable SC light sources.

The teem 'the duration of pulses' is in the present context taken to mean the Full Width Half Maximum duration for Gaussian pulses of essentially constant peak power.

The term 'a micro structured optical transmission medium' is in the present context taken to mean a medium comprising a photonic crystal fibre, also known as microstructured fibres or holey fibres, cf. e.g. T. A. Birks, J. C. Knight, and P. St. J. Russell, "Endlessly single-mode photonic crystal fibre,"

Optics Letters, vol. 22, pp. 961-963 (1997). Various aspects of the design, properties, manufacturing and applications of microstructured optical fibres are e.g. discussed in Bjarklev, Broeng, and Bjarklev in "Photonic crystal fibres", Kluwer Academic Press, 2003 ([Bjarklev et al.]).

The term 'anomalous dispersion' is in the present context taken to indicate a dispersion coefficient larger than 0 (such as larger than +2 ps/nm/km, e.g. +5 ps/nm/km).

In a particular embodiment, the power in the blue shifted part of the spectrum is larger than the power in the red shifted part of the spectrum, both relative to the pump wavelength:

$$\int_{\lambda pump-\lambda 1}^{\lambda pump-\lambda 2} I(\lambda)d\lambda \geq M \int_{\lambda pump+\lambda 2}^{\lambda pump+\lambda 1} I(\lambda)d\lambda$$

where the multiplication factor $M \geq 1$, and: $I(\lambda_{pump}-\lambda_1) \leq -15$ dBm, where $0 < \lambda_2 < \lambda_1 < \lambda_{pump}$.

In an embodiment, the low wavelength border $\lambda_{pump}-\lambda_1$ of the generated blue shifted light is below the half pump wavelength, such that $2(\lambda_{pump}-\lambda_1) < \lambda_{pump} <=> \lambda_{pump} < 2\lambda_1$.

In an embodiment, $I(\lambda_{pump}-\lambda_2)/I(\lambda_{pump}+\lambda_2) \leq 0.1$, such as <0.05, such as <0.01.

By placing the pump wavelength in the anomalous dispersion region of the microstructure fibre (cf. FIGS. 9b, 9c), modulation instability gain is created next to the pump. The extension of this modulation instability gain is a function of the launched pump peak power $P_{Peak}$, and the gain $g_{MI}$ is given by equation 6:

$$g_{MI} = \pm \frac{1}{2}\beta_2\Omega\sqrt{\Omega_C^2 - \Omega^2} \quad (6)$$

Here $\Omega=(\omega-\omega_{pump})$, where $\omega_{pump}=2\pi c/\lambda_{pump}$ and $\Omega_C^2 = 4\gamma P_{Peak}/|\beta_2|$.

The creation of blue shifted light relative to the pump wavelength by excitation of Cherenkov radiation is an attractive alternative to the before mentioned processes as it generates light from the launched pump energy primarily in the bands where the light is wanted when the fibre is dispersion managed relative to the pump wavelength and pulse peak power.

To obtain a substantial increase in the blue part of the spectrum, the quasi-CW pulse duration is to be tailored to the available fibre. If a high intensity Cherenkov radiation line is wanted the Raman solitons are to be shifted to the infrared absorption edge (for silica-based fibres, near 2220 nm) as fast as possible by the soliton self frequency shift. This will lead to the smallest amount of energy shed to other wavelengths than the in this situation wanted narrow band of wavelengths near the phase matching between the Raman soliton at the infrared absorption edge and the Cherenkov radiation.

The fast soliton self frequency shifting can be achieved by choosing a fibre with a high dispersion ($\beta_2$) (e.g. lager than 10 ps/(nm·km)) at all wavelengths longer than or equal to the pump wavelength and/or by increasing the launched peak power to achieve a shorter Raman soliton duration ($T_0$) according to equation (5).

Attention has to be paid to that the group velocity $v_g$(q-CWp) of the quasi-CW pulse needs to exceed the group velocity $v_g$(Cherenkow) of the wavelengths where the Cherenkov radiation is wanted.

A wider band with high spectral density Cherenkov radiation can be achieved when the soliton self frequency shifting is held at a moderate level (e.g. $\beta_2$ in the range from 5 to 10 ps/(nm·km)) such that the soliton rests for a longer stretch of fibre at a given central wavelength. Here again attention has to be paid to the fact that the group velocity of the quasi-CW pulse needs to exceed the group velocity of the wavelengths where the Cherenkov radiation is wanted ($v_g$(q-CWp)>$v_g$(Cherenkow)).

To reach attractive spectral density levels substantial pump pulse energy is required. This is done by increasing the pulse energy of individually launched pulses and/or their repetition rate, while maintaining the peak power level of the launched pulses.

To find the condition given by equation 4 it is required to determine the group velocity dispersion of the fibre of interest to determine the dispersion as well as the dispersion slope (i.e. $\beta_2$ and $\beta_3 = d\beta_2/d\omega$) and preferentially even higher order terms. A white light interferometer measuring method for this purpose is disclosed in ECOC 2002 paper 3.4.2 by Andersen et al. "A photonic crystal fiber with zero dispersion at 1064 nm".

Further, dependent on the actual wanted spectrum, the fibre parameters have to be chosen accordingly. One example of this is shown in connection with example 1.

The spectrum of generated radiation may go beyond the four wave mixing limit. This is determined by the fibre parameters that have to be chosen such that phase match between the dissipative wave (Cherenkov radiation) and the generated solitons yield radiation at such wavelengths beyond the four wave mixing limit.

In some applications it may be useful that the wavelength range of the generated radiation extends up to the pump wavelength. In these cases the wavelength parameter $\lambda_2$ is zero.

The duration of the initially launched pulse should hold a length which makes it viable to initiate the modulation instability gain. If the pulse duration is too short this instability gain may not come into play as the dispersion of the fibre will counteract the initial pulse broadening of the spectrum set by the self phase modulation of the pulse. The initially launched pulse should therefore be kept above a minimum duration of 0.1-0.2 picoseconds, e.g. above 0.15 ps such as above 0.2 ps. Going below this duration will lead to a less efficient generation of a super continuum by the modulation instability. As the cost price of a laser system among other things is dependent on the pulse duration it is preferred that the duration of the initial launched pulses is larger than 0.25 ps, such as larger than 0.5 ps, such as larger than 1.0 ps, such as larger than 5 ps, such as larger than 10 ps, such as larger than 50 ps, such as larger than 1 ns, such as larger than 2 ns, such as larger than 10 ns.

It is an advantage that as much as possible of the generated light goes into the blue part of the spectrum as the SC upon creation is subject to a spectral slicing.

It is hereby advantageous that the multiplication factor M is larger than 1.2, such as larger than such as larger than 1.5, such as larger than 2, such as larger than 2.5, such as larger than 3. This can be achieved by increasing the launched peak power of the pump. The level of needed pump peak power is strongly dependent on the actual fibre dispersion and nonlinear coefficients.

Dependent on the wavelength range that is wanted for the specific application the pump laser wavelength is to be chosen longer than 600 nm. This is mainly due to the fact that current technology only allows for microstructure fibres with a zero dispersion wavelength above 550 nm-580 nm. It might, however, be lower than 600 nm, if an appropriate transmission medium were available. Given that the pump wavelength has to be placed in a region with anomalous dispersion this sets the lower limit of the applicable laser wavelength to about 600 nm. It is however, advantageous to choose a longer wavelength such as in the range 900 nm to 1300 nm, so that a powerful and still economic laser source becomes available. Lasers with wavelengths in the range of 1000 nm to 1100 nm gives at present the best combination of economy and laser pump power.

The transmission medium may comprise any appropriate optical wave-guiding medium exhibiting an anomalous dispersion and for which a phase match can be produced between the solitons and the dissipative wave. Preferably, the transmission medium comprises a silica based optical fibre, e.g. a micro structure optical fibre. Many different transversal arrangements of micro structure features of the optical fibre of the transmission medium may be used. A very efficient medium for achieving the high nonlinear response and simultaneously to manage the dispersion is found in a microstructure optical silica fibre with a waveguide structure having a longitudinal direction, said microstructure optical fibre comprising: a solid core region extending along the longitudinal direction, and a cladding region extending along the longitudinal direction, said cladding region comprising a triangular hole pattern separated by a pitch $\Lambda$ and with a hole diameter d relative to the pitch $d/\Lambda \geq 0.2$. [Bjarklev et al.] describe e.g. dispersion properties (cf. e.g. chapter 5.3.4, pp. 148-151) and the fabrication (cf. e.g. chapter 4, pp. 115-130) of microstructure optical fibres (including triangularly structured fibres).

This microstructure fibre should advantageously hold at least one first zero dispersion wavelength below 1300 nm, such as below 1100 nm, such as below 1064 nm, such as below 1000 nm, such as below 900 nm. The tailoring of the dispersion properties of microstructure fibres is e.g. discussed in WO-02/12931, WO-02/39159, WO-02/088801, WO-02/084350 and WO-03/079074. The choice of zero dispersion wavelength for the fibre depends among other things on the choice of laser source.

Further it is advantageous if the fibre is arranged to support propagation of the wavelength $\lambda_{pump}$ in a single transverse mode (cf. e.g. T. A. Birks, J. C. Knight, and P. St. J. Russell, "Endlessly single-mode photonic crystal fibre," Optics Letters, vol. 22, pp. 961-963 (1997). For some applications it is advantageous if the fibre is arranged to support propagation of all generated wavelengths in the spectrum of wavelengths in a single transverse mode. This will guarantee that the generated light only is delivered in one single transverse mode.

For those applications that need polarized light it will be an advantage that the microstructure fibre is arranged to be polarization maintaining (e.g. by introducing an anisotropy in the core region (by form, stress etc., cf. e.g. WO 00/49436 or WO 2005/059612)). This is due to the fact that the generated radiation obtained when using a homogeneous microstructure fibre (with equal longitudinal propagation of the two degenerate states of the ground mode) is not polarized. For a non-polarization maintaining fibre, polarized light can be obtained by placing a polarizer in front of the fibre, however at the expense of half the generated radiation power.

As the output power of the super continuum light source is directly a measure of the needed pump power level, some applications might only need a moderate output power level which is to be achieved with a more economic pump laser. In these cases the generated radiation us advantageously larger than −10 dBm/nm for at least part of said generated radiation. However, as the sensitivity of many applications will gain with a more powerful light source it might be advantageous to increase the output power level of the generated radiation. This to a level such as larger than −5 dBm/nm, such as larger than 0 dBm/nm, such as larger than 3 dBm/nm, such as larger than 5 dBm/nm, such as larger than 10 dBm/nm, such as larger than 12 dBm/nm, such as larger than 15 dBm/nm, all within the wavelength range $\lambda_1 < \lambda < \lambda_2$ where the intensity level is for at least part of said generated radiation. In one embodiment, 'at least part of said generated radiation' is taken to mean $\lambda_1 - \lambda_2$ larger than 0.01 nm, such as larger than 0.05 nm, such as larger than 0.1 nm, such as larger than 0.5 nm, such as larger than 1 nm, such as larger than 5 nm, such as larger than 10 nm, such as larger than 50 nm, such as larger than 100 nm, such as larger than 300 nm, such as larger than 500 nm.

An article comprising a super continuum light source as described above, in the detailed description and in the claims is furthermore provided. The article may e.g. be optimized for use in applications such as spectroscopy, ultra-short-pulse generation, optical radar and ranging (LIDAR), optical computing, reaction rate studies, etc.

In a further aspect of the invention a method of manufacturing a blue extended super continuum light source is provided, the blue part of the generated spectrum substantially extending from a low wavelength border $\lambda_{pump}-\lambda_1$ to a high wavelength border $\lambda_{pump}-\lambda_2$, the method comprising:

a) providing a pump laser, which operates at a wavelength $\lambda_{pump}$ and produces pump pulses of a duration longer than 0.2 picoseconds with a repetition rate higher than 1 kHz, and holds a peak power $P_{Peak}$, and b) providing a micro structured optical fibre adapted to transmit radiation at $\lambda_{pump}$, the fibre having at least one wavelength region of anomalous dispersion and a second order dispersion parameter $\beta_2(\lambda)$ and a non-linear parameter $\gamma$, which are adapted so that a phase match between said low wavelength border and the infra red absorption band edge stabilization point is provided at said peak power, and the high wavelength border is chosen so that the group velocity at said high wavelength border is smaller than or equal to the group velocity at said pump wavelength, and c) providing that the pump wavelength $\lambda_{pump}$ lies within the region of anomalous dispersion of the fibre, and said peak power, said second order dispersion parameter $\beta_2$, and said non-linear parameter $\gamma$ are chosen such that a part of each of said pump pulses—when launched into said micro structured fibre—breaks into trains of Tera Hertz repetition rate pulses, and d) where—while keeping said peak power constant at the chosen level—said duration and said repetition rate of said pump pulses are arranged to provide that the intensity of at least part of the generated radiation $I(\lambda) > -10$ dBm/nm where $\lambda_1 < \lambda < \lambda_2$.

In a particular embodiment, the power in the blue shifted part of the spectrum is larger than the power in the red shifted part of the spectrum, both relative to the pump wavelength:

$$\int_{\lambda_{pump}-\lambda_1}^{\lambda_{pump}-\lambda_2} I(\lambda)d\lambda \geq M \int_{\lambda_{pump}+\lambda_2}^{\lambda_{pump}+\lambda_1} I(\lambda)d\lambda$$

where the multiplication factor $M \geq 1$, and:
$I(\lambda_{pump}-\lambda_1) \leq -15$ dBm, where $0 < \lambda_2 < \lambda_1 < \lambda_{pump}$.

The method provides the same advantages as the corresponding product. The features of the product as described above and in the detailed description below and in the claims are intended to be used in combination with the method, where appropriate.

Further objects of the invention are achieved by the embodiments defined in the dependent claims and in the detailed description of the invention.

It should be emphasized that the term "comprises/comprising" when used in this specification is taken to specify the presence of stated features, integers, steps or components but does not preclude the presence or addition of one or more other stated features, integers, steps, components or groups thereof.

BRIEF DESCRIPTION OF THE DRAWINGS

In the following, the invention will be explained in more details with reference to the New blue extended super continuum light source according to the invention shown in the drawing, in that FIG. 1 shows a prior art optical spectrum of a SC generated in a 75 cm section of microstructure fibre with 8 kW input peak power. The dashed curve shows the spectrum of the initial 100 fs pulse. Prior art by Ranka et al. (Optics Letters, Vol. 25, no. 1, January (2000), pp. 25-27);

FIG. 9 schematically shows an optical spectrum of a continuum according to the invention indicating parameters for characterising the spectrum (FIG. 9a), a dispersion vs. wavelength curve (FIG. 9b) and a modulation instability gain vs. wavelength curve (FIG. 9c).

MODE(S) OF CARRYING OUT THE INVENTION

In the following, the dimensioning and application of the new blue extended super continuum light source will be discussed in connection with a number of examples.

Example 1

The microstructure fibre of example 1 consists of a 3.5 µm diameter silica core surrounded by an array of 1.1 µm diameter air holes in a hexagonal close packaged arrangement (also known as a triangular pattern) with a hole centre to centre distance of about 2.44 µm. The fibre is produced by Crystal fibre A/S (of Birkerød, Denmark) and has the product name NL-3.5-975. Experimentally the fibre appears to be endlessly single mode and insensitive to bend loss up to at least 1700 nm. The fibre holds a zero dispersion wavelength at 974 nm and anomalous dispersion for all wavelengths above this wavelength. The pump laser source applied in the present example is produced by Fianium (of Southampton, UK) and has the product name FEMTOPOWER 1060, operation at 1064 nm and delivering 10 W of average power. The 6 ps pulses with a repetition rate of 80 MHz and a peak power of 16 kW are launched into the microstructure fibre. This generates by the action of modulation instability a pulse train with 32.2 THz repetition rate in the current fibre. This pulse train is responsible for the generated spectrum at full excitation power shown in FIG. 6.

Figure 7:
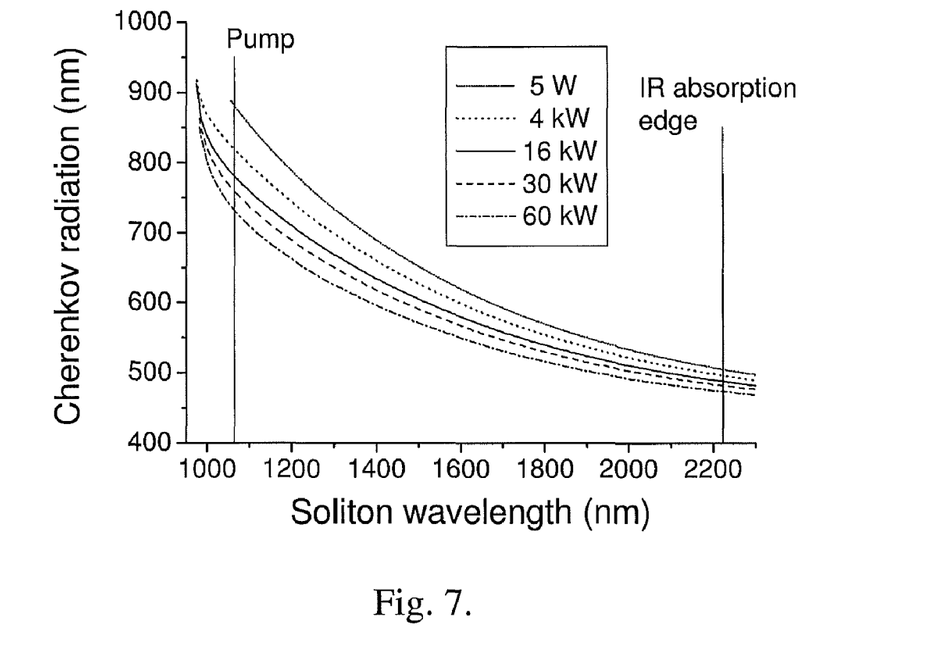
FIG. 7 shows a plot of the calculated phase match between Raman red shifted soliton ('light bullet') and Cherenkov radiation wavelengths of the fibre used in one aspect of the present invention.

The calculated Cherenkov radiation wavelength as function of "light bullet" soliton central wavelength is shown in FIG. 7. Along with the phase matching seeded radiation curves the pump wavelength and non linear absorption edge stabilization point is indicated in FIG. 7. At the 2220 nm wavelength the Cherenkov radiation from low power solitons 5 W peak power is expected at 505 nm. Increasing the peak power to the soliton order number N=4 ground soliton with 4 kW peak power radiation phase match is found at 495 nm. Increasing the soliton peak power to correspond with N=1 and 16 kW leads to phase match with 487 nm, and increasing further the soliton peak power to 30 kW leads to phase match at 481 nm and for soliton peak power of 60 kW phase match at 473 nm.

Figure 6:
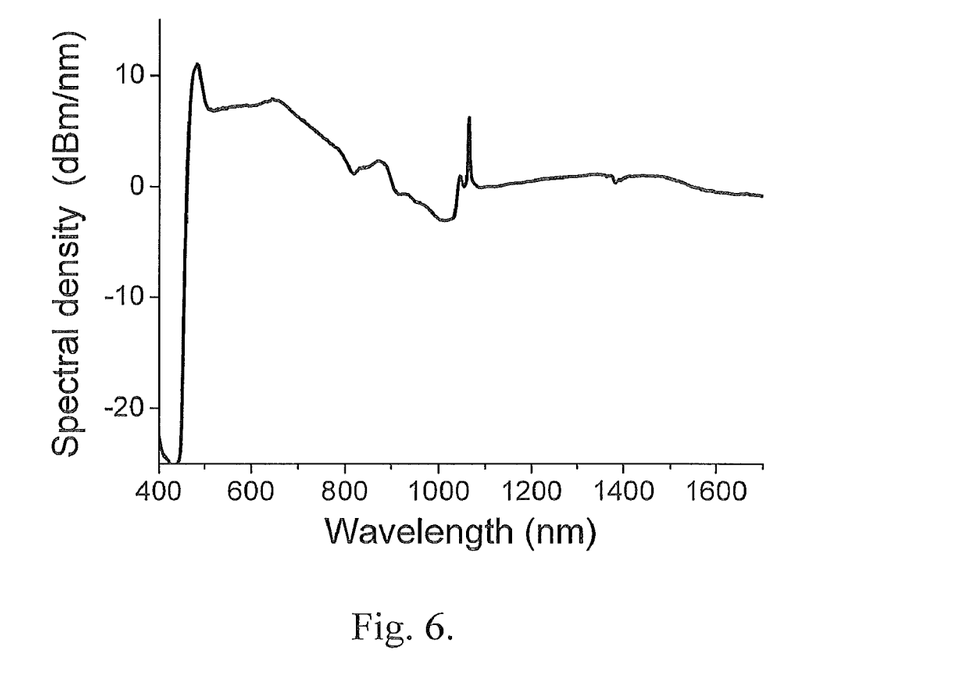
FIG. 6 shows an optical spectrum of the continuum generated according to the present invention.

Comparing the calculated wavelengths with the generated spectrum shown in FIG. 6, it is to be observed that a step-like increase in radiation power is observed when going from the pump wavelength towards the shorter wavelengths. The steps correspond for the first step with low power pulses within the pump pulse seeding cherenkov radiation at wavelengths around 800-900 nm dependent on the actual seed pulse peak power. The medium step around 600-700 nm corresponds with a stabilization taking place near 1400 nm in the present fibre. This stabilization is due to change of sign of $\beta_3$ (dispersion slope) which leads to slowing down the red shifting of solitons leading to increased power seeding at these wavelengths. The final peak steems from the stabilized solitons near the infrared absorption edge. Here the dispersion slope reaches values which completely cancel the Raman gain induced red shifting of solitons. The effectiveness of the process only being limited by the temporal overlap with the launched quasi-CW pulse and loss of energy due to the increased absorption near the infrared absorption edge.

The optimum fibre length has not been determined, however increasing the length of the fibre (from the current 10 m) will be at the expense of increased fibre absorption loss due to the background loss of the fibre of about 0.4 dB/m.

To apply this spectrum as a light source for example in connection with spectroscopy or confocal microscopy, spectral slicing of the spectrum by use of either glass filters or mirrors is an easy way to produce light with the wanted bandwidth. Adjusting the peak power level of the excitation source is one way to adjust the power level of the generated light. Another possible way is through use of neutral density filtering of the spectra.

Example 2

Figure 8:
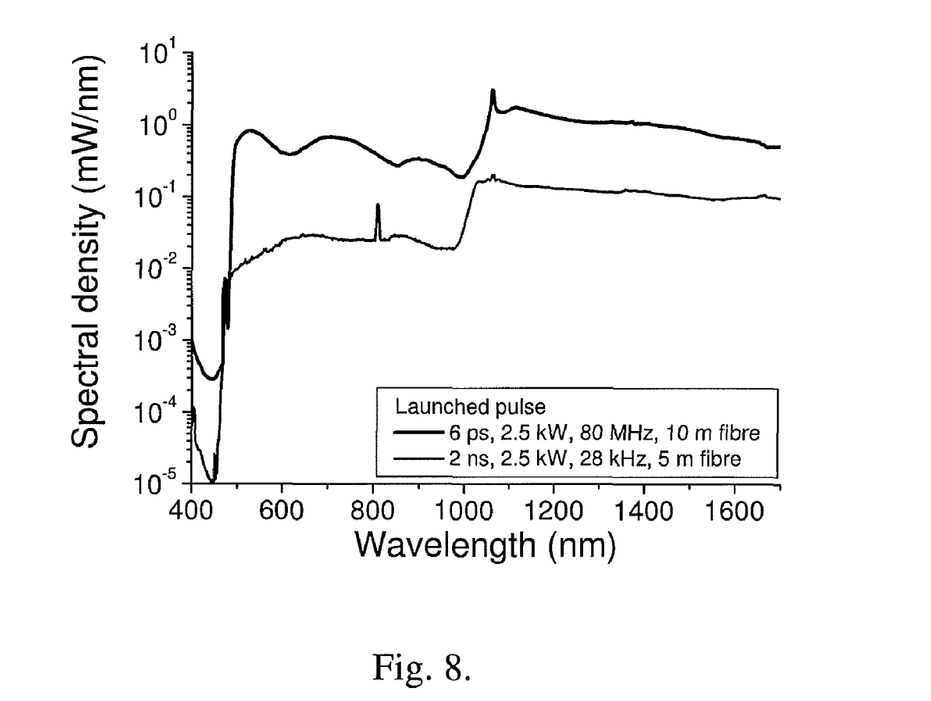
FIG. 8 shows optical spectra of the continua generated according to the present invention with a 2.5 kW peak power at 6 ps and 2 ns launched pulse durations respectively.

In this example the fibre of example 1 is subjected to excitation pump pulses with considerably longer pulse duration and launched quasi-cw pulse energy. The generated spectra of a 6 ps launched pulse width of 80 MHz repetition rate and a 2 ns launched pulse width of 28 kHz repetition rate both with a peak power level of 2.5 kW are shown in FIG. 8. The second excitation source is a combined Nd YAG laser crystal with a Cr:YAG saturable absorber pumped with a 808 nm GaAs diode laser.

Surprisingly, it is to be observed that the two spectra are similar despite the very different excitation conditions. As the two spectra both are generated with equal peak power it is, however, according to the teaching of the present invention, equal modulation instability conditions that is set by the fibre. It will therefore be pulse trains containing individual pulses of equal duration and peak power that is generated by the two different launched pulses. As these individual pulses are substantially equal, the generated Cherenkov radiation will be at substantially the same wavelengths.

It is to be observed that both spectra in FIG. 8 extend blue shifted beyond the half pump wavelength limit. This is due to the generation of light by the "light bullet" stabilized in at the infrared absorption edge as calculated in FIG. 7. The less efficient generation of the 2 ns pulse in the short wavelength range is believed mainly to be due to the shorter length of fibre applied for this experiment. Apart from this the heat generated in the fibre glass material by the 2 ns pulse compared with the 6 ps pulse is higher leading to a dynamic shifting of the refractive index and hereby shifting the dispersion slope and phase matching between the red shifting solitons and the Cherenkov radiation. The short wavelength edge of the 2 ns quasi-CW pulse spectrum is to be found 473 nm whereas the 6 ps short wavelength edge is found near 495 nm. Part of the difference might, however, be due to a non optimum 6 ps quasi-CW pulse temporal overlap with the infrared absorption edge stabilized soliton compared with the 2 ns pulse where it is the lifetime of the stabilized soliton that sets the limit to the time available for seeded Cherenkov radiation.

It is worth to notice that the 2 ns excitation pulse will lead to a catastrophic breakdown of the fibre at the fibre entrance when a too high pulse peak power level is launched into the fibre (above 2.7 kW). This is due to the much higher energy per pulse that is available in the 2 ns excitation pulse as compared with the 6 ps excitation pulse. This will lead to that the initial coupling of the pulse to the fibre becomes critical in the nanosecond pulse regime. Typically the pulse energy is in the 1-10 μJ/pulse range for the nanosecond pulses as compared with 1-10 nJ/pulse for the picoseconds pulses.

It is further worth to notice that the output power per nm ratio between the two spectra corresponds well with the launched energy per time period. This such that the 6 ps system holds 1.2 J launched energy per second compared with 0.14 J launched energy per second for the 2 ns system. Comparing the spectral density of the two systems it is noted that the output in the visible is 26 μW/nm for the 2 ns system compared with 360 μW/nm for the 6 ps leading to a 1:14 ratio compared with the launched energy per time ratio of 1:9. The ratio of the launched energy per time frame for the two spectra is substantially identical with the ratio of the output power per nm. The lacking energy of the 2 ns system is believed to be due to the local heating by the long pulse.

To obtain a wavelength range different from the one in example 1 and 2, the fibre dispersion profile has to be managed. One way to perform this is by calculating the expected Cherenkov radiation wavelengths for various dispersion profiles and hereby to determine the wanted dispersion zero point, and dispersion slope and higher order derivates of the dispersion both at the pump wavelength of choice as well as at the infrared absorption edge stabilization point.

Intense blue lines will be found where phase match with the 2220 nm absorption edge position for solitons trapped here. This requires, however that there is a temporal overlap between the generated soliton and the quasi-CW pump pulse once the soliton has been self frequency shifted to the 2220 nm position. Optimal fibre design and quasi-CW pulse parameters (peak power and pulse duration) may preferably be determined by an optimization process, e.g. a trial and error-process.

The invention claimed is:

1. A blue extended super continuum light source arranged to provide a generated spectrum having an intensity I($\lambda$) as a function of wavelength $\lambda$ and having a blue part relative to a pump wavelength $\lambda_{pump}$ comprising wavelengths from $\lambda_{pump}-\lambda_1$ to $\lambda_{pump}-\lambda_2$, wherein $\lambda_{pump}-\lambda_1 < \lambda_{pump}/2$, said light source comprising:
   a) a micro structured optical fiber adapted to transmit radiation at $\lambda_{pump}$, said fiber having at least one wavelength region of anomalous dispersion comprising both $\lambda_{pump}$ and an infra red absorption band edge stabilization point, and said fiber having a dispersion parameter $\beta(\lambda)$ and a non-linear parameter $\gamma$ arranged so that light generated at 2220 nm phase matches with a wavelength equal to or less than 495 nm, and said fiber having a group velocity at $\lambda_{pump}-\lambda_2$ smaller than or equal to a group velocity at said pump wavelength,
   b) a pump source pumping said microstructured fiber with pump pulses at said pump wavelength with a duration, full width half maximum, of $T_{FWHM} \geq 1$ ps and a peak power $P_{Peak}$ at a repetition rate higher than 1 kHz,
   wherein said pump source and microstructured optical fiber is arranged such that a part of each of said pump pulses pumped into said fiber breaks into trains of Tera Hertz repetition rate pulses, the generated spectrum extends to the infra red absorption band edge stabilization point, and I($\lambda$)>-5 dBm/nm for a range of wavelengths from $\lambda_{pump}-\lambda_1$ to $\lambda_{pump}-\lambda_2$, which range of wavelengths includes 473 nm, and where $\lambda_1-\lambda_2$ is larger than 100 nm.

2. The blue extended super continuum light source according to claim 1, wherein said pulse duration is larger than 5 ps.

3. The blue extended super continuum light source according to claim 1, wherein said wavelength $\lambda_{pump}$ is in the range from 1000 nm to 1100 nm.

4. The blue extended super continuum light source according to claim 1, wherein said microstructure fiber exhibits a least one first zero dispersion wavelength below 1100 nm.

5. The blue extended super continuum light source according to claim 1, wherein said microstructure fiber is arranged to support propagation of the wavelength $\lambda_{pump}$ in a single transverse mode.

6. The blue extended super continuum light source according to claim 1, wherein said microstructure fiber is arranged to be polarization maintaining.

7. The blue extended super continuum light source according to claim 1, wherein said wavelength $\lambda_{pump}$ is in the range from 900 nm to 1300 nm.

8. The blue extended super continuum light source of claim 1, wherein said fiber has a high dispersion so that $\beta_2 > 10$ ps/(nm·km)) at all wavelengths longer than or equal to the pump wavelength.

9. The blue extended super continuum light source according to claim 1, wherein said fiber has moderate level dispersion so that $\beta_2$ is in the range 5 to 10 ps/(nm·km) at all wavelengths longer than or equal to the pump wavelength.

10. The blue extended super continuum light source according to claim 1, wherein the infra red absorption band edge stabilization point is a wavelength near 2220.

11. The blue extended super continuum light source according to claim 1, wherein light generated at 2220 nm phase match to a wavelength less than or equal to 489 nm.

12. The blue extended super continuum light source according to claim 1, wherein light generated at 2220 nm phase match to a wavelength less than or equal to 481 nm.

13. The blue extended super continuum light source according to claim 1, wherein said wavelength $\lambda_{pump}$ is in the range from 900 nm to 1300 nm.

14. The blue extended super continuum light source according to claim 1, wherein $\lambda_1-\lambda_2$ is larger than 300 nm.

15. The blue extended super continuum light source according to claim 1, wherein $\lambda_1-\lambda_2$ is larger than 500 nm.

16. The blue extended super continuum light source according to claim 1, wherein $I(\lambda)>0$ dBm/nm for a range of wavelengths from $\lambda_{pump}-\lambda_1$ to $\lambda_{pump}-\lambda_2$ comprising 473 nm and where $\lambda_1-\lambda_2$ is larger than 300 nm.

17. The blue extended super continuum light source according to claim 1, wherein $I(\lambda)>0$ dBm/nm for a range of wavelengths from $\lambda_{pump}-\lambda_1$ to $\lambda_{pump}-\lambda_2$ comprising 481 nm and where $\lambda_1-\lambda_2$ is larger than 300 nm.

18. The blue extended super continuum light source according to claim 1, wherein $I(\lambda)>5$ dBm/nm for a range of wavelengths from $\lambda_{pump}-\lambda_1$ to $\lambda_{pump}-\lambda_2$ comprising 473 nm and where $\lambda_1-\lambda_2$ is larger than 100 nm.

19. The blue extended super continuum light source according to claim 1, wherein $I(\lambda)>5$ dBm/nm for a range of wavelengths from $\lambda_{pump}-\lambda_1$ to $\lambda_{pump}-\lambda_2$ comprising 481 nm and where $\lambda_1-\lambda_2$ is larger than 100 nm.

20. The blue extended super continuum light source according to claim 1, wherein $I(\lambda)>10$ dBm/nm for a range of wavelengths from $\lambda_{pump}-\lambda_1$ to $\lambda_{pump}-\lambda_2$ comprising 481 nm and where $\lambda_1-\lambda_2$ is larger than 10 nm.

21. A blue extended super continuum light source arranged to provide a generated spectrum having an intensity $I(\lambda)$ as a function of wavelength $\lambda$ and having a blue part relative to a pump wavelength $\lambda_{pump}$ comprising wavelengths from $\lambda_{pump}-\lambda_1$ to $\lambda_{pump}-\lambda_2$, wherein $\lambda_{pump}-\lambda_1<\lambda_{pump}/2$, said light source comprising:

a) a micro structured optical fiber adapted to transmit radiation at $\lambda_{pump}$, said fiber having at least one wavelength region of anomalous dispersion comprising both $\lambda_{pump}$ and an infra red absorption band edge stabilization point, and said fiber having a dispersion parameter $\beta(\lambda)$ and a non-linear parameter $\gamma$ arranged so that light at $\lambda_{pump}-\lambda_1$ phase matches with the infrared absorption band edge stabilization point and said fiber having a group velocity at $\lambda_{pump}-\lambda_2$ smaller than or equal to a group velocity at said pump wavelength, b) a pump source pumping said microstructured fiber with pump pulses at said pump wavelength with a duration, full width half maximum, of $T_{FWHM} \geq 1$ ps and a peak power $P_{Peak}$ at a repetition rate higher than 1 kHz, wherein said pump source and microstructured optical fiber is arranged such that a part of each of said pump pulses pumped into said fiber breaks into trains of Tera Hertz repetition rate pulses, the generated spectrum extends to the infra red absorption band edge stabilization point, and $I(\lambda)>-5$ dBm/nm for a range of wavelengths from $\lambda_{pump}-\lambda_1$ to $\lambda_{pump}-\lambda_2$ comprising 473 nm, and where $\lambda_1-\lambda_2$ is larger than 100 nm.

22. The blue extended super continuum light source according to claim 21, wherein said microstructure fiber is arranged to be polarization maintaining.

23. The blue extended super continuum light source according to claim 21, wherein $\lambda_1-\lambda_2$ is larger than 300 nm.

24. The blue extended super continuum light source according to claim 21, wherein $\lambda_1-\lambda_2$ is larger than 500 nm.

25. The blue extended super continuum light source according to claim 21, wherein $I(\lambda)>0$ dBm/nm for a range of wavelengths from $\lambda_{pump}-\lambda_1$ to $\lambda_{pump}-\lambda_2$ comprising 473 nm and where $\lambda_1-\lambda_2$ is larger than 300 nm.

26. The blue extended super continuum light source according to claim 21, wherein $I(\lambda)>0$ dBm/nm for a range of wavelengths from $\lambda_{pump}-\lambda_1$ to $\lambda_{pump}-\lambda_2$ comprising 481 nm and where $\lambda_1-\lambda_2$ is larger than 300 nm.

27. The blue extended super continuum light source according to claim 21, wherein $I(\lambda)>5$ dBm/nm for a range of wavelengths from $\lambda_{pump}-\lambda_1$ to $\lambda_{pump}-\lambda_2$ comprising 473 nm and where $\lambda_1-\lambda_2$ is larger than 100 nm.

28. The blue extended super continuum light source according to claim 21, wherein $I(\lambda)>5$ dBm/nm for a range of wavelengths from $\lambda_{pump}-\lambda_1$ to $\lambda_{pump}-\lambda_2$ comprising 481 nm and where $\lambda_1-\lambda_2$ is larger than 100 nm.

29. The blue extended super continuum light source according to claim 21, wherein $I(\lambda)>10$ dBm/nm for a range of wavelengths from $\lambda_{pump}-\lambda_1$ to $\lambda_{pump}-\lambda_2$ comprising 481 nm and where $\lambda_1-\lambda_2$ is larger than 10 nm.

* * * * *